US012707156B2

(12) United States Patent
Karahashi et al.

(10) Patent No.: US 12,707,156 B2
(45) Date of Patent: Aug. 11, 2026

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventors: Fumihito Karahashi, Kanagawa (JP); Kosuke Matsubara, Tokyo (JP); Toshiyuki Takada, Tokyo (JP); Kento Iimori, Tokyo (JP); Toshiharu Ueda, Tokyo (JP); Yohei Kanda, Kanagawa (JP); Jun Kameda, Tokyo (JP); Shohei Tozawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 18/780,912

(22) Filed: Jul. 23, 2024

(65) Prior Publication Data

US 2024/0380987 A1 Nov. 14, 2024

Related U.S. Application Data

(63) Continuation of application No. PCT/JP2022/048564, filed on Dec. 28, 2022.

(30) Foreign Application Priority Data

Feb. 25, 2022 (JP) ................................ 2022-028385
Oct. 3, 2022 (JP) ................................ 2022-159718

(51) Int. Cl.
*H04N 23/76* (2023.01)
*H04N 23/741* (2023.01)

(52) U.S. Cl.
CPC ........... *H04N 23/76* (2023.01); *H04N 23/741* (2023.01)

(58) Field of Classification Search
CPC .............................. H04N 25/57; H04N 23/76
(Continued)

(56) References Cited

U.S. PATENT DOCUMENTS 9,148,584 B1 * 9/2015 Linzer .................... H04N 23/81
2009/0190005 A1 * 7/2009 Mo ........................ H04N 25/76 348/241
(Continued)

FOREIGN PATENT DOCUMENTS

JP 2019193150 A * 10/2019
JP 2020043391 A 3/2020
JP 2020115604 A 7/2020

OTHER PUBLICATIONS

Foreign Patent Documents #1, 2, and 3 were cited in the International Search Report dated Mar. 28, 2023, of International Application No. PCT/JP2022/048564, which is enclosed without an English translation.

*Primary Examiner* — Lin Ye
(74) *Attorney, Agent, or Firm* — Cowan, Liebowitz & Latman, P.C.

(57) ABSTRACT

An image capturing apparatus includes analog amplification unit for amplifying one pixel signal by a plurality of types of analog gain, digital amplification unit for amplifying the one pixel signal by a plurality of types of digital gain, and control unit for performing control so as to, in a case where a target gain is obtainable with only analog gain, perform first control for amplifying the pixel signal by a first gain and a second gain with the analog amplification unit, and, in a case where the target gain is not obtainable with only analog gain, perform second control for amplifying the pixel signal by the first gain and the second gain, using the analog amplification unit and the digital amplification unit.

11 Claims, 7 Drawing Sheets

(58) Field of Classification Search
USPC .......................................................... 348/222.1
See application file for complete search history.

(56) References Cited

U.S. PATENT DOCUMENTS

| | | | | |
|---|---|---|---|---|
| 2016/0021289 | A1* | 1/2016 | Chen | H04N 23/76 348/230.1 |
| 2016/0377738 | A1* | 12/2016 | Aartsen | G01T 1/17 378/62 |
| 2019/0104271 | A1* | 4/2019 | Isoda | H04N 25/778 |
| 2019/0306397 | A1* | 10/2019 | Hisa | H04N 23/75 |
| 2020/0228740 | A1* | 7/2020 | Otaka | H04N 25/57 |
| 2021/0281792 | A1* | 9/2021 | Wang | H04N 25/677 |

* cited by examiner 150
120
100
101
102
103
104
105
106
FOCUS ACTUATOR
116
DIAPHRAGM ACTUATOR
118
RAM
108
DSP
107
CPU
109
DISPLAY UNIT
110
OPERATION UNIT
111
RECORDING MEDIUM
112
ROM
113
SHUTTER DRIVE CIRCUIT
114
FOCUS DRIVE CIRCUIT
115
DIAPHRAGM DRIVE CIRCUIT
117

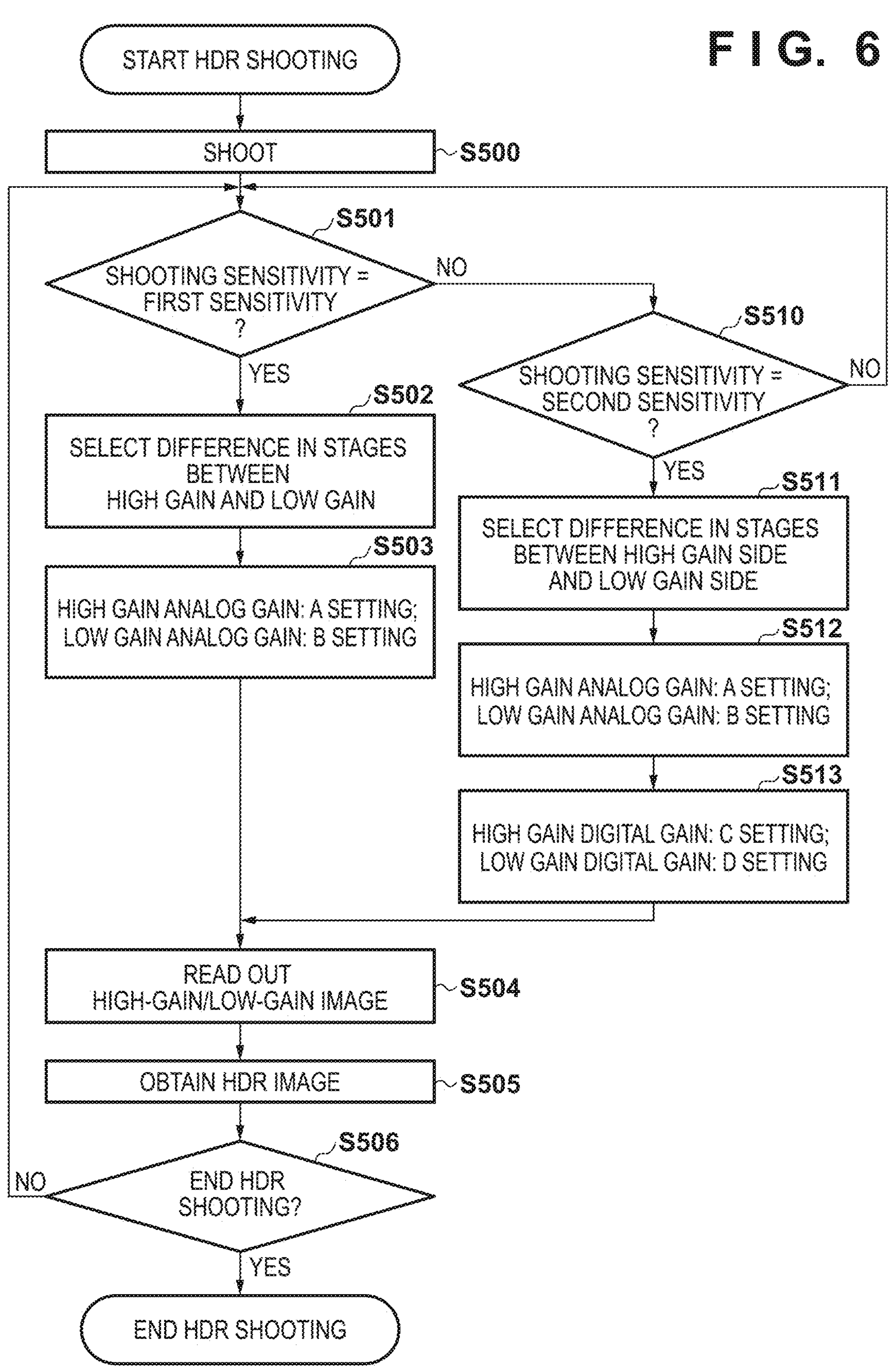
FIG. 6
START HDR SHOOTING
SHOOT
S500
S501
SHOOTING SENSITIVITY = FIRST SENSITIVITY ?
NO
YES
S502
SELECT DIFFERENCE IN STAGES BETWEEN HIGH GAIN AND LOW GAIN
S503
HIGH GAIN ANALOG GAIN: A SETTING; LOW GAIN ANALOG GAIN: B SETTING
S510
SHOOTING SENSITIVITY = SECOND SENSITIVITY ?
NO
YES
S511
SELECT DIFFERENCE IN STAGES BETWEEN HIGH GAIN SIDE AND LOW GAIN SIDE
S512
HIGH GAIN ANALOG GAIN: A SETTING; LOW GAIN ANALOG GAIN: B SETTING
S513
HIGH GAIN DIGITAL GAIN: C SETTING; LOW GAIN DIGITAL GAIN: D SETTING
READ OUT HIGH-GAIN/LOW-GAIN IMAGE
S504
OBTAIN HDR IMAGE
S505
S506
END HDR SHOOTING?
NO
YES
END HDR SHOOTING

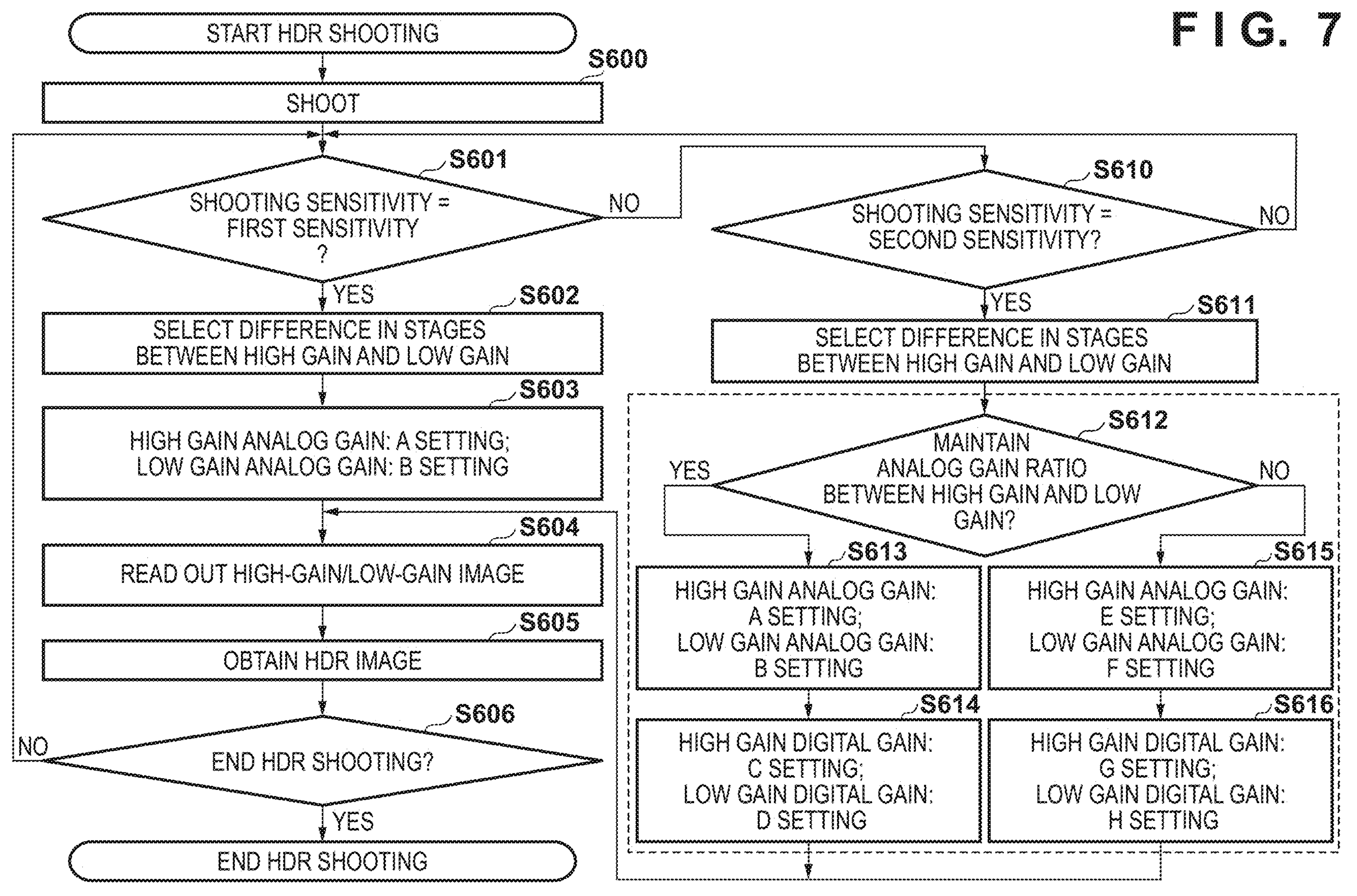
FIG. 7
START HDR SHOOTING
S600
SHOOT
S601
SHOOTING SENSITIVITY = FIRST SENSITIVITY ?
YES
NO
S602
SELECT DIFFERENCE IN STAGES BETWEEN HIGH GAIN AND LOW GAIN
S603
HIGH GAIN ANALOG GAIN: A SETTING; LOW GAIN ANALOG GAIN: B SETTING
S604
READ OUT HIGH-GAIN/LOW-GAIN IMAGE
S605
OBTAIN HDR IMAGE
S606
END HDR SHOOTING?
NO
YES
END HDR SHOOTING
S610
SHOOTING SENSITIVITY = SECOND SENSITIVITY?
NO
YES
S611
SELECT DIFFERENCE IN STAGES BETWEEN HIGH GAIN AND LOW GAIN
S612
MAINTAIN ANALOG GAIN RATIO BETWEEN HIGH GAIN AND LOW GAIN?
YES
NO
S613
HIGH GAIN ANALOG GAIN: A SETTING; LOW GAIN ANALOG GAIN: B SETTING
S615
HIGH GAIN ANALOG GAIN: E SETTING; LOW GAIN ANALOG GAIN: F SETTING
S614
HIGH GAIN DIGITAL GAIN: C SETTING; LOW GAIN DIGITAL GAIN: D SETTING
S616
HIGH GAIN DIGITAL GAIN: G SETTING; LOW GAIN DIGITAL GAIN: H SETTING

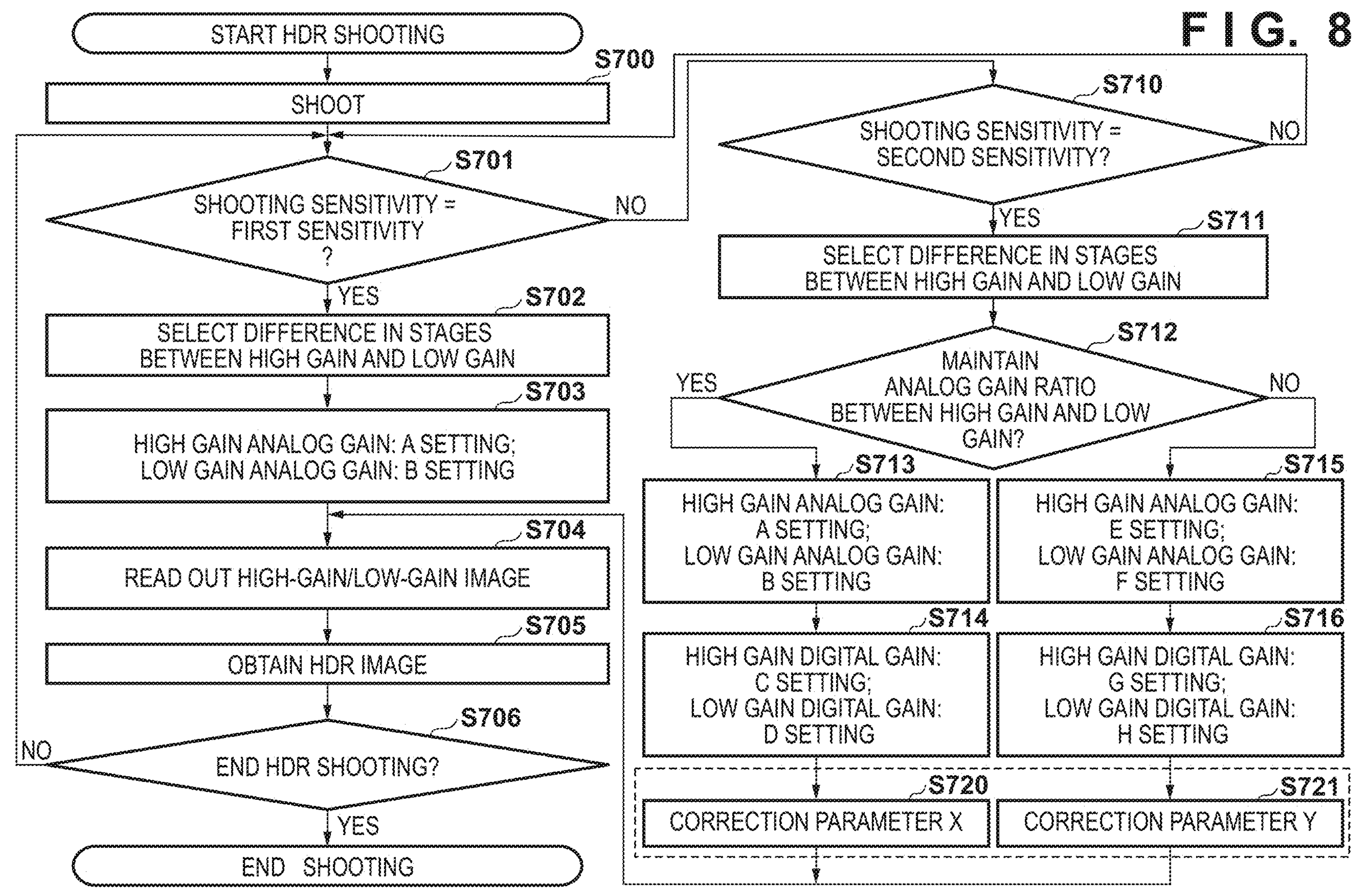
FIG. 8
START HDR SHOOTING
S700
SHOOT
S701
SHOOTING SENSITIVITY = FIRST SENSITIVITY ?
YES
NO
S702
SELECT DIFFERENCE IN STAGES BETWEEN HIGH GAIN AND LOW GAIN
S703
HIGH GAIN ANALOG GAIN: A SETTING; LOW GAIN ANALOG GAIN: B SETTING
S704
READ OUT HIGH-GAIN/LOW-GAIN IMAGE
S705
OBTAIN HDR IMAGE
S706
END HDR SHOOTING?
YES
NO
END SHOOTING
S710
SHOOTING SENSITIVITY = SECOND SENSITIVITY?
YES
NO
S711
SELECT DIFFERENCE IN STAGES BETWEEN HIGH GAIN AND LOW GAIN
S712
MAINTAIN ANALOG GAIN RATIO BETWEEN HIGH GAIN AND LOW GAIN?
YES
NO
S713
HIGH GAIN ANALOG GAIN: A SETTING; LOW GAIN ANALOG GAIN: B SETTING
S714
HIGH GAIN DIGITAL GAIN: C SETTING; LOW GAIN DIGITAL GAIN: D SETTING
S715
HIGH GAIN ANALOG GAIN: E SETTING; LOW GAIN ANALOG GAIN: F SETTING
S716
HIGH GAIN DIGITAL GAIN: G SETTING; LOW GAIN DIGITAL GAIN: H SETTING
S720
CORRECTION PARAMETER X
S721
CORRECTION PARAMETER Y

IMAGE CAPTURING APPARATUS, CONTROL METHOD THEREOF, AND STORAGE MEDIUM

CROSS-REFERENCE TO RELATED APPLICATIONS

This application is a Continuation of International Patent Application No. PCT/JP2022/048564, filed Dec. 28, 2022, which claims the benefit of Japanese Patent Application No. 2022-028385, filed Feb. 25, 2022 and Japanese Patent Application No. 2022-159718, filed Oct. 3, 2022, all of which are hereby incorporated by reference herein in their entirety.

BACKGROUND OF THE INVENTION

Field of the Invention

The present invention relates to an image capturing apparatus and a control method thereof.

Background Art

Heretofore, technologies for expanding the dynamic range relating to gradation using an image sensor such as a CCD image sensor or a CMOS image sensor used in general digital cameras have been proposed.

Patent Document 1 discloses an image capturing apparatus capable of reading out a signal obtained by amplifying the output signal of one pixel by a first analog gain and a signal obtained by amplifying the output signal of the same pixel by a second analog gain. An image whose dynamic range is expanded using an image of the first gain and an image of the second gain can then be obtained.

CITATION LIST

Patent Literature

PTL1: Japanese Patent Application Publication No. 2020-43391

However, with the above method described in Patent Document 1, the amplification factor when expanding the dynamic range is limited to the first and second gains, and thus dynamic range expansion processing at various shooting sensitivities is not supported.

The present invention has been made in view of the above-described problem and provides an image capturing apparatus that is able to acquire a dynamic range expanded image having little variation in noise effect, irrespective of the set shooting sensitivity.

SUMMARY OF THE INVENTION

According to the present invention, there is provided an image capturing apparatus comprising: an analog amplification circuit configured to amplify one pixel signal by a plurality of types of analog gain; a digital amplification circuit configured to amplify the one pixel signal by a plurality of types of digital gain; and at least one processor or circuit configured to function as: a control unit configured to perform control so as to, in a case where a target gain is obtainable with only analog gain, perform first control for amplifying the pixel signal by a first gain and a second gain with the analog amplification circuit, and, in a case where the target gain is not obtainable with only analog gain, perform second control for amplifying the pixel signal by the first gain and the second gain, using the analog amplification circuit and the digital amplification circuit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a flowchart showing shooting operations in the first embodiment.

FIG. 7 is a flowchart showing shooting operations in a second embodiment.

FIG. 8 is a flowchart showing shooting operations in a third embodiment.

DESCRIPTION OF THE EMBODIMENTS

Figure 1:
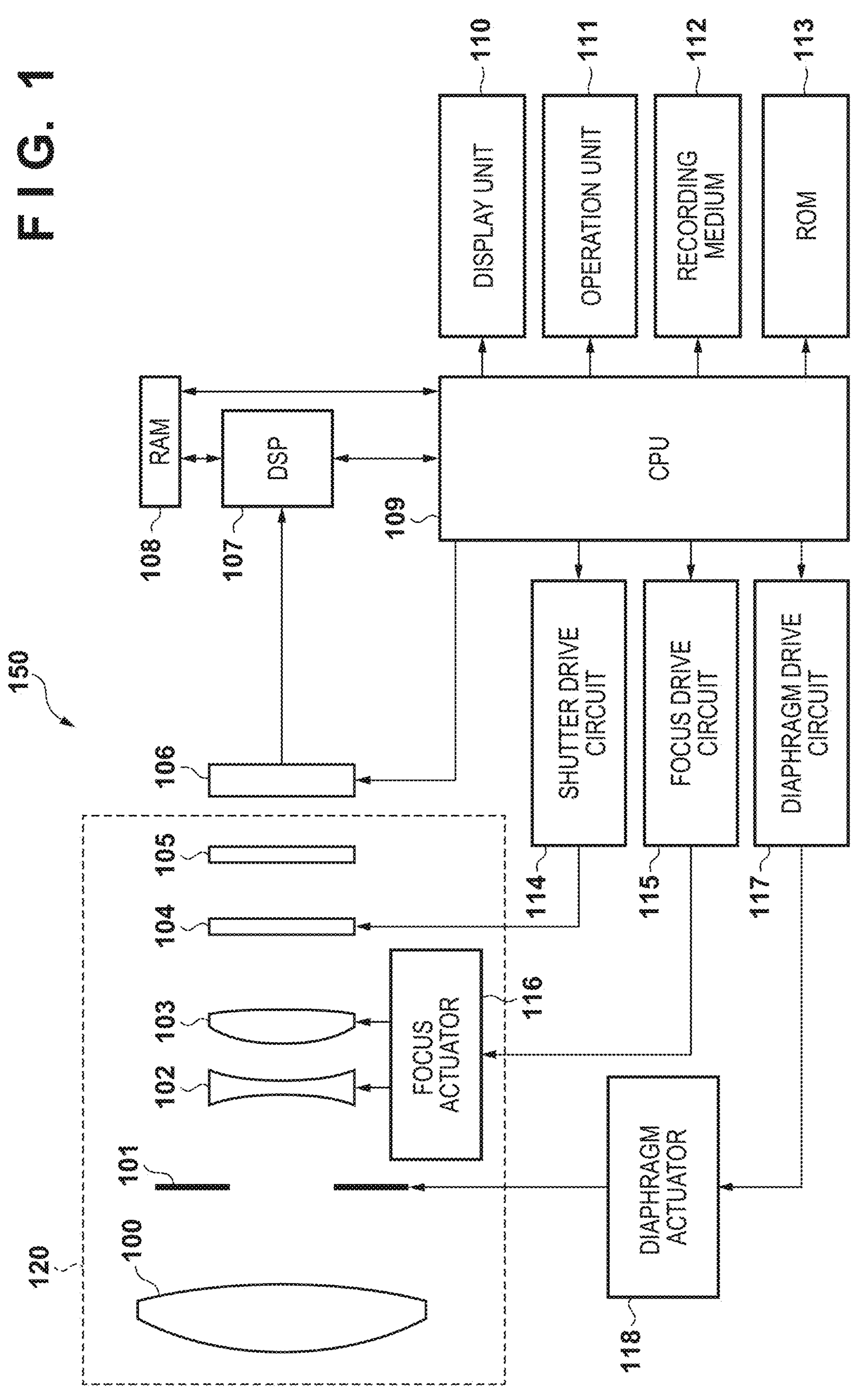
FIG. 1 is a block diagram showing a configuration of an image capturing apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing a configuration of an image capturing apparatus 150 according to a first embodiment of the present invention.

In FIG. 1, a first lens 100 is disposed at a leading end of a shooting optical system 120. A diaphragm 101 is driven by a diaphragm actuator 118 described later, and light intensity adjustment at the time of shooting is performed by adjusting an aperture diameter thereof. A second lens 102 and a third lens 103 are driven by a focus actuator 116 described later, and adjust the focus of the shooting optical system 120 by moving back and forth in the optical axis direction.

A focal plane shutter 104 is driven by a shutter drive circuit 114 described later, and adjusts the exposure time of an image sensor 106 at the time of still image shooting. Note that the image sensor 106 may have an electronic shutter function and may be configured to adjust the exposure time with a control pulse. An optical lowpass filter 105 is provided in order to reduce false colors, moiré and the like in shot images. The image sensor 106 converts an optical image of a subject formed by the shooting optical system 120 into an electrical signal. The image sensor 106 is controlled by a CPU 109 described later.

A DSP (Digital Signal Processor) 107 performs image processing such as correction processing and HDR composition processing (HDR image generation processing) of image data shot by the image sensor 106. Also, the DSP 107 has a function (digital amplification function) of applying a plurality of types of digital gain to pixel signals (described in detail later) amplified by a plurality of types of analog gain and output by the image sensor 106.

Here, in the present embodiment, the case where a plurality of types of digital gain are applied by the DSP 107 will be described, but a configuration may be adopted in which a plurality of types of digital gain are applied inside the image sensor 106. A RAM 108 has a function of signal holding means for holding output data of the image sensor 106, a function of image data storage means for storing image data processed by the DSP 107, and a function of a work memory for when the CPU 109 described later performs operations.

Note that, in the present embodiment, these functions are realized by the RAM 108, but other types of memory can also be used as long as the memory has a sufficiently high access speed and is of a level that no operational problems arise. Also, in the present embodiment, the RAM 108 is disposed outside the DSP 107 and the CPU 109, but a configuration may be adopted in which some or all of the functions thereof are built into the DSP 107, the CPU 109 or the like.

The CPU 109 performs overall control of the operations of the image capturing apparatus 150. The CPU 109 executes a program for controlling the various parts of the image capturing apparatus 150. That is, the CPU 109 also has a function of controlling a focus drive circuit 115 and adjusting the focus of the shooting optical system 120, using the result of a correlation operation output by the DSP 107. In the present embodiment, the CPU 109 acts as a focus detection unit, but this function may be provided inside the image sensor 106.

The display unit 110 displays shot still images and moving images, menus, and the like. An operation unit 111 instructs a shooting command and settings such as shooting conditions input by the user to the CPU 109. The recording medium 112 is a removable recording medium for recording still image data and moving image data. A ROM 113 stores the program that the CPU 109 loads and executes in order to control the operations of the various parts.

Based on the output of the CPU 109, the shutter drive circuit 114 controls the drive of the focal plane shutter 104. The focus drive circuit 115 is focus position change means for changing the focus position of the shooting optical system 120. The focus drive circuit 115 then controls the focus actuator 116 based on the output of the CPU 109, and performs focus adjustment by driving the second lens 102 and the third lens 103 to move back and forth in the optical axis direction. A diaphragm drive circuit 117 controls the diaphragm actuator 118 to control the opening of the diaphragm 101 based on the output of the CPU 109.

Figure 2:
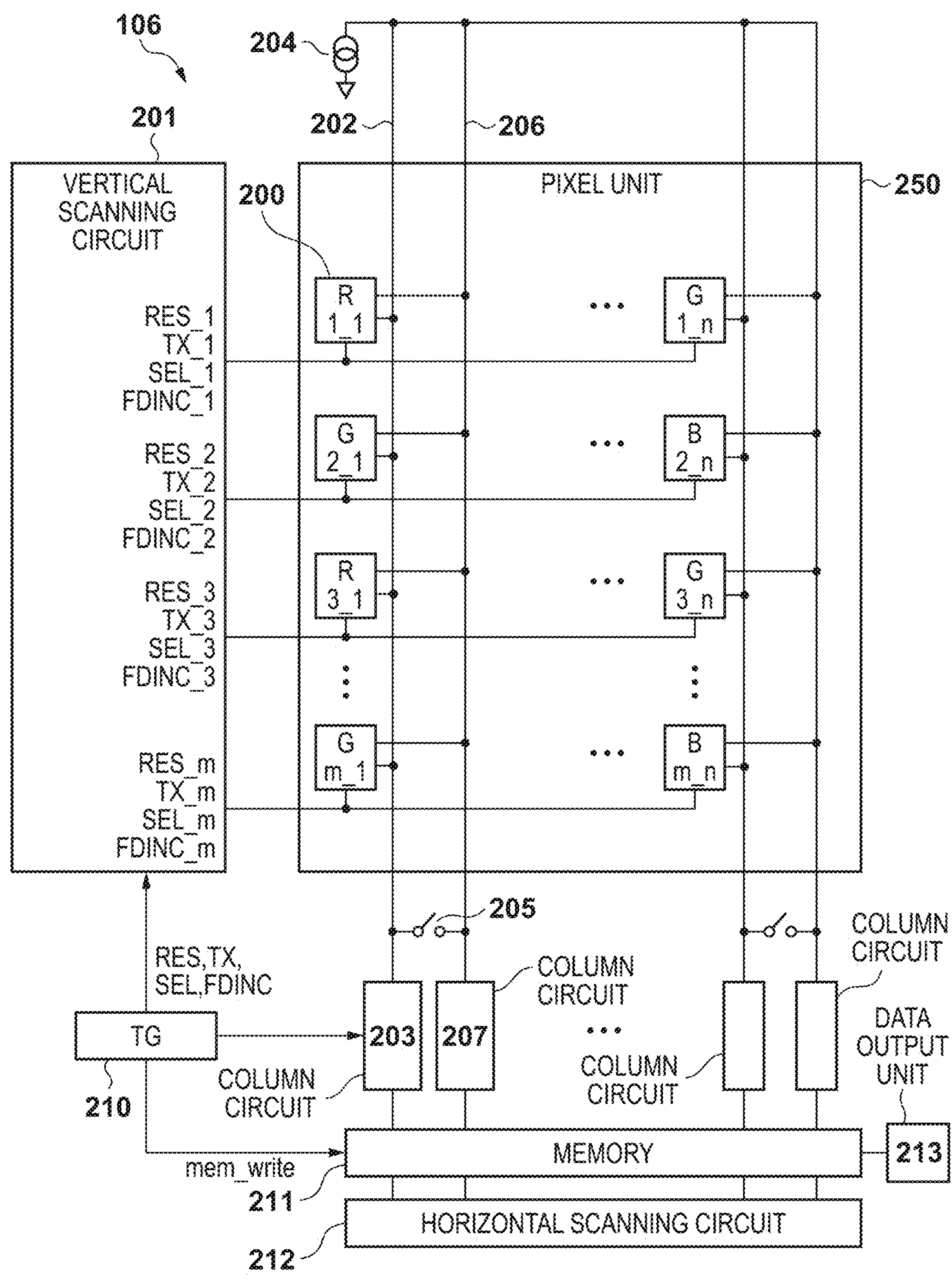
FIG. 2 is a diagram showing a configuration of an image sensor used in the image capturing apparatus.

FIG. 2 is a diagram showing an example of a circuit configuration of the image sensor 106. In a pixel array 250, a plurality of pixels 200 are arranged in a matrix. R, G and B on the pixels 200 signify that red, green, and blue color filters are disposed on the respective pixels. Also, R (G, B) m_n (where m, n are arbitrary integers) indicates the pixel of the m-th row and n-th column in the pixel unit 250. Also, odd rows of pixels 200 in the same column are connected to a column output line 202, and even rows of pixels are connected to a column output line 206.

The column output line 202 is connected to a column circuit 203, and the column output line 206 is connected to a column circuit 207. Also, a column circuit switch 205 is provided between the column output line 202 and the column output line 206.

When the column circuit switch 205 is off, the pixel signals output from the odd rows of pixels 200 are input to only the column circuit 203 via the column output line 202. The pixel signals output from the even rows of pixels 200 are also similarly input to only the column circuit 207 via the column output line 206. When the column circuit switch 205 is off, the signals of the odd rows of pixels 200 and the signals of the even rows of pixels 200 are read out at the same time.

Also, when the column circuit switch 205 is on, the pixel signals output from the odd rows of pixels 200 are input to the column circuit 203 and the column circuit 207 via the column output line 202 and the column circuit switch 205. The pixel signals output from the even rows of pixels 200 are also similarly input to the column circuit 203 and the column circuit 207 via the column output line 206 and the column circuit switch 205. When the column circuit switch 205 is on, the signals of the odd rows of pixels 200 and the signals of the even rows of pixels 200 are sequentially read out alternately.

The drive signals RES, TX, SEL, and FDINC are respectively supplied to the pixels 200 from a vertical scanning circuit 201. These drive signals are denoted by RES_m, TX_m, SEL_m, FDINC_m to which a natural number m (=1, 2, . . . , n) representing the number corresponding to the row is added.

Figure 3:
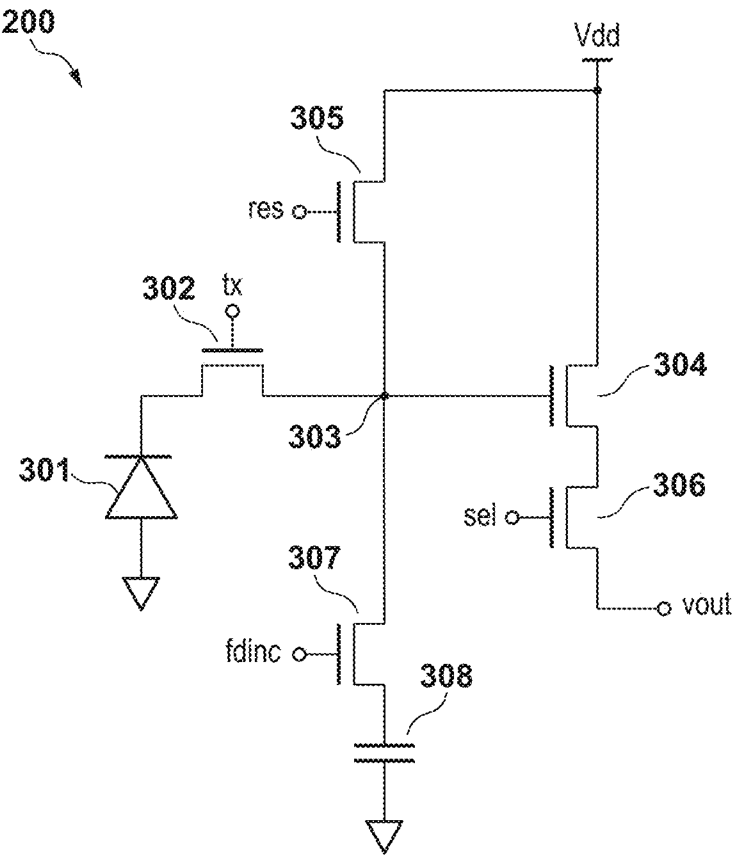
FIG. 3 shows a diagram showing a configuration of one pixel of the image sensor.

Here, the configuration of the pixels 200 will be described with reference to FIG. 3.

A photodiode (hereinafter abbreviated as PD) 301 photoelectrically converts incident light and stores electric charge that depends on the amount of incident light. A transfer switch 302 transfers the electric charge stored in the PD 301 to a floating diffusion unit 303, when the level of the drive signal tx is High. Hereinafter, floating diffusion will be denoted as FD. The FD unit 303 is connected to the gate of a transistor constituting an FD amplifier 304. The FD amplifier 304 converts the electric charge amount transferred from the PD 301 into a voltage value.

An FD reset switch 305 is a switch element for resetting the FD unit 303, and performs resetting of the FD unit 303 when the level of the drive signal res is High. Also, when the levels of the drive signal tx and the drive signal res are High at the same time, both the transfer switch 302 and the FD reset switch 305 turn on, and resetting of the PD 301 is performed via the FD unit 303.

An FDinc switch 307 turns on when the level of the drive signal fdinc is High, and an additional capacitor 308 is connected to the FD unit 303. Also, when the level of the drive signal fdinc is Low, the FDinc switch 307 turns off, and the additional capacitor 308 and the FD unit 303 are disconnected. The capacitance generated in the FD unit 303 thereby changes. In other words, the FDinc switch 307 and the additional capacitor 308 function as capacitance variable means in which the capacitance value of the input node is variable.

By turning the FDinc switch 307 on and off, the conversion ratio of the output voltage of the FD amplifier 304 to the electric charge transferred to the FD unit 303, that is, the gain (hereinafter referred to as FD gain) of the FD amplifier 304, can be switched. In the connected state in which the additional capacitor 308 is connected to the FD unit 303, the electrostatic capacitance value increases, and the gain becomes smaller than in the disconnected state.

Conversely, when the additional capacitor 308 and the FD unit 303 are disconnected, the electrostatic capacitance value decreases, and the gain becomes larger than in the connected state. In this way, the image capturing apparatus 150 of the present embodiment is capable of changing the amount of electric charge held in the FD unit 303 according to the drive signal fdinc, and is able to switch the gain of the pixels 200 (analog amplification function). It thus becomes possible to output a plurality of types of analog gain.

The pixel selection switch 306 outputs a pixel signal vout converted to a voltage by the FD amplifier 304, when the level of the drive signal sel is High. The output signals of the pixels 200 are input to the column circuits 203 and 207 via the column output lines 202 and 206 for each column as aforementioned. Note that, in the present embodiment, one pixel 200 is connected to one column output line, but one pixel 200 may be connected to a plurality of column output lines. Also, by turning the column circuit switch 205 on, it is possible to connect the two column circuits 203 and 207 to one column output line, making it possible to amplify the output signal of one pixel 200 by different types of analog gain.

Next, the configuration of the column circuit 203 will be described, with reference to FIG. 4. Note that since the column circuit 207 has a similar configuration to the column circuit 203, description thereof is omitted here. The output signals vout of the pixels 200 are input to the column circuit 203 via the column output line 202. The column output line 202 provided for each column is grounded via a current source 204. A source follower circuit is constituted by the current source 204 and the FD amplifier 304 of the pixels 200 connected to the column output line 202.

In the column circuit 203, a clamp capacitor 401 has an electrostatic capacitance C1, and a feedback capacitor 402 has an electrostatic capacitance C2. The output signals vout of the pixels 200 are input to an inverting input terminal of an operational amplifier 403 via the clamp capacitor 401. A reference voltage Vref is supplied to a non-inverting input terminal of the operational amplifier 403.

A switch 404 is connected in parallel with the feedback capacitor 402 connected to the inverting input terminal and an output terminal of the operational amplifier 403. The switch 404 is a switch element for shorting both ends of the feedback capacitor 402 and is controlled by a drive signal cfs. Since the gain settings can be changed by on/off control of the switch 404, it becomes possible to output signals amplified by a plurality of types of analog gain.

An S signal transfer switch 405 is a switch element for transferring pixel signals (S signals) read out from the pixels 200 to the S signal holding capacitor 407. By setting the level of a drive signal ts to High, the S signals amplified by the operational amplifier 403 are held in an S signal holding capacitor 407 via the S signal transfer switch 405.

An N signal transfer switch 406 is a switch element for transferring noise signals (N signals) read out from the pixels 200 to an N signal holding capacitor 408. By setting the level of a drive signal tn to High, the N signals amplified by the operational amplifier 403 are held in the N signal holding capacitor 408 via the N signal transfer switch 406.

The S signals held in the S signal holding capacitor 407 are output as an output voltage vs, and the N signals held in the N signal holding capacitor 408 are output as an output voltage vn. The difference between the output voltage vs of the S signal and the output voltage vn of the N signal is converted into a digital signal by an AD converter (analog-digital converter) described later. The drive signals cfs, ts, tn and the like are supplied to the column circuit 203 from a TG 210 in accordance with control by the CPU 109.

Figure 5:
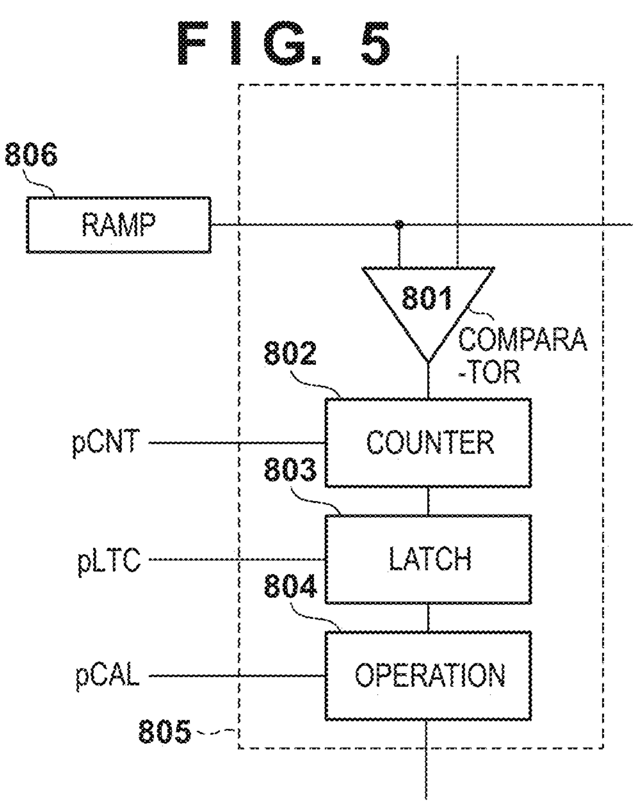
FIG. 5 is a diagram showing a configuration of an analog-to-digital converter.

FIG. 5 is a diagram showing a configuration of the AD converter. The AD converter is provided with a comparator 801, a counter circuit 802, a latch circuit 803, and an operational circuit 804. A ramp signal generation unit 806 (hereinafter, RAMP) is a circuit that generates a ramp signal that changes over time.

Figure 4:
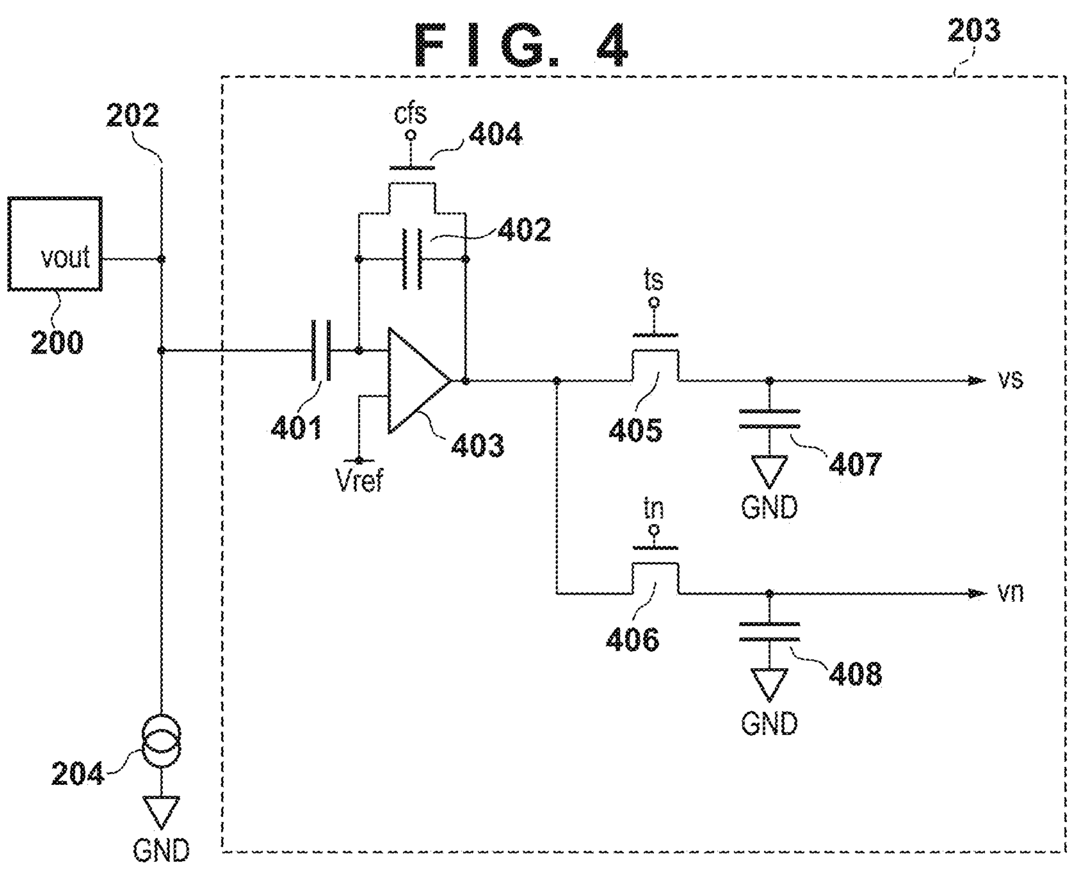
FIG. 4 is a diagram showing a configuration of a column circuit.

The comparator 801 compares the pixel signal amplified by the analog amplification function of the column circuit 203 illustrated in FIG. 4 with the ramp signal generated by the ramp signal generation unit 806, and outputs an inverted signal at the timing at which the ramp signal which varies over time matches the pixel output.

The counter circuit 802 performs a counting operation based on a clock supplied from a connected counter control line pCNT. The counter circuit 802 starts the counting operation from the timing at which the comparator 801 starts comparing the pixel signal and the ramp signal, and outputs a count value at the timing at which the output of the comparator 801 is inverted.

The latch circuit 803 temporarily holds the count value output by the counter circuit 802 and outputs the held count value based on control via the connected latch control line pLTC.

The operational circuit 804 stores the count value output by the latch circuit 803 as a digital signal of the pixels, based on control via the connected operational control line pCAL. In addition, the operational circuit 804 outputs the stored digital signal of the pixels.

Here, the gain settings in the AD converter will be described. A configuration may be adopted in which the pixel signal is amplified with different gains at the time of AD conversion, by changing the temporal change in the ramp signal with a downstream AD converter, without being limited to the analog gain in the column amplifiers 203 and 207 as described above. That is, if the temporal change of the ramp signal is slow, inversion of the output of the comparator 801 will be delayed, and the count value will increase. Because the speed of the temporal change of the ramp signal corresponds to the amplification factor of the output signals of the unit pixels 200, this will be referred to as RAMP gain, and the RAMP gain can be switched by changing the degree of temporal change.

Returning to FIG. 2, the image data output by the column circuit 203 or the column circuit 207 is held in a memory 211 in accordance with a write signal memwr output by the timing generator (TG) 210. The image data held in the memory 211 is sequentially transferred to a data output unit 213 as a result of scanning by a horizontal scanning circuit 212. The data output unit 213 outputs image data to outside of the image sensor 106 by a transmission method such as LVDS (Low Voltage Differential Signaling).

Next, the operations of the image capturing apparatus of the first embodiment will be described. FIG. 6 is a flowchart for describing HDR shooting operations in the image capturing apparatus of the first embodiment. The operations of this flowchart are realized by the CPU 109 executing a program stored in the ROM 113.

In the present embodiment, HDR shooting is performed, by acquiring a HIGH image and a LOW image, by amplifying the output signal of the same pixel 200 obtained by one exposure (single exposure) by different analog gains. HDR shooting is started by a shooting instruction input by the user through the operation unit 111.

First, in step S500, the CPU 109 acquires an image signal by opening and closing the shutter 104 and exposing the image sensor 106 once by controlling the shutter drive circuit 114 in accordance with an instruction input by the user through the operation unit 111.

In step S501, the CPU 109 determines whether the shooting sensitivity currently set is a first sensitivity. For example, the first sensitivity is set, in the case where the target gain (hereinafter referred to as the real gain) can be obtained with only analog gain, in a comparatively bright environment in which sunlight or natural light enters. Note that the analog gain shown here refers to a gain for obtaining the real gain, and a digital gain may be used as the gain used for fine adjustment or the like.

If it is determined that the currently set shooting sensitivity is the first sensitivity, the processing proceeds to step S502, and if it is determined that the currently set shooting sensitivity is different from the first sensitivity, the processing proceeds to step S510.

In step S502, the CPU 109 determines the difference in stages (gain ratio) between the image on the high gain side (HIGH image) and the image on the low gain side (LOW image) that will be required in the HDR composition processing, according to a user instruction input through the operation unit 111. For example, in the case where the difference in stages between the HIGH image and the LOW image is set to “3”, a gain of 8 times and a gain of 1 times are respectively set to be applied to the HIGH image and the LOW image.

Here, a difference of “3” stages is given as an example, but the difference in stages is not limited thereto. Also, any combination pattern of the respective gains of the HIGH image and the LOW image may be adopted as long as the gains are analog gains that can be set inside the image sensor 106. In other words, in the above, an example in which the gain of the HIGH image is 8 times and the gain of the LOW image is 1 times is described, but a three stage difference combination in which, for example, the gain of the HIGH image is 64 times and the gain of the LOW image is 8 times may be adopted.

In step S503, the CPU 109 sets the analog gains of the HIGH image and the LOW image on the basis of the difference in gain stages between the HIGH image and the LOW image determined in step S502. Here, the analog gain of the HIGH image will be called “A setting”, and the analog gain of the LOW image will be called “B setting”. For example, the gain settings are configured such that “A setting” is an analog gain of 8 times and “B setting” is an analog gain of 1 times.

Note that, in the present embodiment, analog gain obtained by using the additional capacitor 308 or the feedback capacitor 402 for both the HIGH image and the LOW image is assumed in the case of the first sensitivity. However, the present invention is not limited thereto, and other means capable of setting analog gain may be selected.

In step S504, the HIGH image and the LOW image are both read out at the gains set in step S503. At this time, it is possible to read out both the HIGH image and the LOW image, by turning on the column circuit switch 205, and amplifying the output signal of one pixel 200 obtained by one exposure (single exposure) by different analog gains using the column circuit 203 and the column circuit 207 as aforementioned.

In step S505, the CPU 109 performs HDR composition processing using the HIGH image and LOW image that are read out and acquires an image having an expanded dynamic range.

In step S506, the CPU 109 determines whether to continue HDR shooting, and the processing ends in the case of not continuing HDR shooting, and returns to step S501 in the case of continuing HDR shooting.

Next, the case where the shooting sensitivity that is currently set differs from the first sensitivity will be described.

If it is determined in step S501 that the currently set shooting sensitivity differs from the first sensitivity, the processing proceeds to step S510.

In step S510, the CPU 109 determines whether the currently set shooting sensitivity is a second sensitivity. For example, the second sensitivity is set, in the case where the real gain can be obtained by using analog gain and digital gain together and supplementing the deficiency in the analog gain with the digital gain, in a comparatively dark environment in which sunlight or natural light does not enter such as indoors.

If it is determined that the currently set shooting sensitivity is the second sensitivity, the processing proceeds to step S511, and, if it is determined that the currently set shooting sensitivity differs from the second sensitivity, the processing returns to step S501.

As aforementioned, in the second sensitivity settings, analog gain and digital gain are used together in order to obtain the real gain, but digital gain for use in fine adjustment and the like may be further applied.

In step S511, the CPU 109 determines the difference in stages (gain ratio) between the HIGH image and the LOW image that will be required in the HDR composition processing, in accordance with a user instruction input through the operation unit 111, similarly to step S502. For example, when the difference in stages between the HIGH image and the LOW image is set to “3”, a gain of 8 times and a gain of 1 times are respectively set to be applied to the HIGH image and the LOW image.

Here, the difference of “3” stages is given as an example, and the difference in stages is not limited thereto. Also, any combination pattern of the respective gains of the HIGH image and the LOW image may be adopted as long as the gains can be set inside the image sensor 106 or by the DSP 107. In other words, in the above, the gain of the HIGH image is given as 8 times and the gain of the LOW image is given as 1 times, but a three stage difference combination in which the gain of the HIGH image is 64 times and the gain of the LOW image is 8 times may be adopted.

In step S512, the CPU 109 sets the analog gains of the HIGH image and the LOW image in the column circuit 203 and the column circuit 207 on the basis of the difference in gain stages between the HIGH image and the LOW image determined in step S511. Here, the analog gain of the HIGH image will be called “A setting”, and the analog gain of the LOW image will be called “B setting”. At this time, A setting is the maximum value that can be obtained with analog gain. In the present embodiment, analog gain is applied by the additional capacitor 308, the feedback capacitor 402, or the like to both the HIGH image and the LOW image in the case of the second sensitivity.

In step S513, the CPU 109 sets the digital gains of the HIGH image and the LOW image. Here, the digital gain of the HIGH image will be called “C setting”, and the digital gain of the LOW image will be called “D setting”. Note that, in the present embodiment, it is assumed that application of digital gain to both the HIGH image and the LOW image is performed by a DSP or the like in the case of the second sensitivity, but is not limited thereto, and digital gain may be applied inside the image sensor 106.

The case where the gain of the HIGH image is 64 times, the gain of the LOW image is 8 times, the gain difference between the HIGH image and the LOW image is 3 stages, and the maximum value of the analog gain is 32 times will be considered.

The analog gain "A setting" determined in step S512 is the maximum value of the analog gain as aforementioned and will thus be 32 times. Also, because the stage difference determined in step S511 is 3 stages, "B setting" will be 4 times. Accordingly, in order to obtain the real gain, a digital gain of 2 times needs to be set for both the HIGH image and the LOW image. In other words, "C setting" of the digital gain will be set to 2 times and "D setting" will be set to 2 times.

As described above, by using analog gain and digital gain together, it becomes possible to obtain the real gain of the HIGH image and the LOW image.

According to the first embodiment, at the time of HDR shooting, an image is acquired by using only analog gain for both the HIGH image and the LOW image in the case of the first sensitivity. Also, in the case of the second sensitivity, an image is obtained by using analog gain and digital gain together for both the HIGH image and the LOW image. Thus, the difference in gain stages between the HIGH image and the LOW image can be maintained and an image having an expanded dynamic range and little variation in noise effect can be obtained, regardless of the set shooting sensitivity.

Second Embodiment

Next, a second embodiment of the present invention will be described focusing on differences from the first embodiment. Since the processing when the set shooting sensitivity is the first sensitivity is the same as the processing described in the first embodiment, the following description will focus on the case where the set shooting sensitivity is the second sensitivity.

FIG. 7 is a flowchart for describing HDR shooting operations in an image capturing apparatus of the second embodiment. The operations of this flowchart are realized by the CPU 109 executing a program stored in the ROM 113. HDR shooting setting is started by a shooting instruction input by the user through the operation unit 111.

In step S600 to step S606, step S610, and step S611, similar processing to step S500 to step S506, step S510, and step S511 shown in the first embodiment is performed, and thus description thereof is omitted.

In step S612, the CPU 109 determines whether or not to maintain the analog gain ratio of the HIGH image and LOW image of the first sensitivity, according to the shooting mode, shooting conditions, and the like. For example, when the shooting mode is a mode for continuous shooting such as a moving image, the noise effect may differ between frames and the screen may appear to flicker when the analog gain ratio differs between frames.

In general, when analog gain and digital gain are compared, amplification using analog gain includes less noise than amplification using digital gain. This is because analog gain can be applied at the comparatively early stage of the image sensor 106 and is thus little affected by circuit noise and the like. Thus, in cases such as the above, maintaining the analog gain ratio results in a moving image with less flicker.

Also, as described in the first embodiment, in the case of the second sensitivity, it is assumed that, when the analog gain that is applied in acquiring the HIGH image is the maximum gain, there will still be room to increase the analog gain that is applied in acquiring the LOW image. Thus, if the analog gain ratio is not maintained, the analog gain that is applied in acquiring the LOW image can also be used up to the maximum gain. For example, in the case of shooting one image at a time such as still images, the difference in noise effect is hardly noticeable depending on the shooting sensitivity, and thus the analog gain that is applied in acquiring the LOW image can be used up to the maximum gain, and an image having reduced noise can be acquired.

The example shown above is merely one example, and it may be determined whether or not to maintain the analog gain ratio depending on another shooting mode, shooting conditions, and the like.

Returning to the description of FIG. 7, the processing proceeds to step S613 in the case of maintaining the analog gain ratio of the HIGH image and LOW image of the first sensitivity, and the processing proceeds to step S615 in the case of not maintaining the analog gain ratio.

In step S613, the CPU 109 maintains the analog gain ratio of the HIGH image and LOW image at the settings used for the first sensitivity. Similar processing to step S512 is performed, and similar processing to step S513 is also performed in the next step S614.

In other words, when the second sensitivity is set, the analog gain that is applied in acquiring the HIGH image is set to "A setting" and the analog gain that is applied in acquiring the LOW image is set to "B setting", in the case of maintaining the same analog gain ratio as the first sensitivity. Also, the digital gain that is applied in acquiring the HIGH image is set to "C setting" and the digital gain that is applied in acquiring the LOW image is set to "D setting".

At this time, the analog gain ratio remains constant between the first sensitivity and the second sensitivity, and thus an HDR image having little variation in noise effect can be acquired regardless of the set shooting sensitivity. Thus, in HDR shooting of continuous frames such as a moving image as aforementioned, the noise effect will be constant even if the shooting sensitivity changes from frame to frame, making it possible to suppress flicker between frames.

Next, the case where a different gain ratio from the analog gain ratio of the HIGH image and LOW image of the first sensitivity settings is set in the case of the second sensitivity will be described.

In step S615, a different analog gain ratio from the first sensitivity is set, with the analog gain that is applied in acquiring the HIGH image being set to "E setting", the analog gain that is applied in acquiring the LOW image being set to "F setting". For example, the analog gain that is applied in acquiring the LOW image may be used to the limit, and the gain difference due to the analog gain may be eliminated.

In that case, the difference in stages between the HIGH image and the LOW image determined in step S611 is set to be supplemented by using digital gain in step S616. At this time, the digital gain that is applied in acquiring the HIGH image is set to "G setting", and the digital gain that is applied in acquiring the LOW image is set to "H setting". These settings differ from the digital gains set in step S614.

As aforementioned, in scenes where images are shot one at a time such as still images, the difference in noise effect is hardly noticeable depending on the shooting sensitivity, and thus the analog gain can be used to the limit in the LOW image, and an image having reduced noise can be obtained.

According to the second embodiment, in the case where the second sensitivity is set at the time of HDR shooting, whether or not to maintain the analog gain ratio of the HIGH image and LOW image used when the first sensitivity is set can be changed according to the shooting mode, shooting conditions, and the like. In the case of maintaining the analog gain ratio, an image having an expanded dynamic range and little variation in noise effect can be acquired regardless of the shooting sensitivity. Also, in the case of changing the analog gain ratio, it is possible to reduce noise in the LOW image, and an image having an expanded dynamic range and little noise can be acquired.

Third Embodiment

Next, a third embodiment of the present invention will be described focusing on differences from the second embodiment. In the third embodiment, correction parameters for when the set shooting sensitivity is the second sensitivity will be described. As described in the second embodiment, it is possible to acquire a high-quality HDR image, by switching whether or not to maintain the analog gain ratio according to the shooting mode, shooting conditions, and the like in the case of the second sensitivity.

At this time, parameters for image correction whose characteristics change according to the amount of analog gain need to be switched similarly to the analog gain ratio. For example, the linearity (linear characteristics) of the luminance output could possibly differ between analog gain of 1 times and analog gain of 64 times, and correction so as to align the respective linearities thereof according to the amount of analog gain needs to be performed.

FIG. 8 is a flowchart for describing shooting operations in an image capturing apparatus of the third embodiment. The operations of this flowchart are realized by the CPU 109 executing a program stored in the ROM 113. HDR shooting is started by a shooting instruction input by the user through the operation unit 111.

Since step S700 to step S706 and step S710 to step S716 perform similar processing to step S600 to step S606 and step S610 to step S616 shown in the second embodiment, description thereof is omitted.

The processing of step S720 that is executed when the set shooting sensitivity is the second sensitivity and it is determined in step S712 to maintain the analog gain ratio of the HIGH image and LOW image of the first sensitivity will be described. Note that the determination criteria of step S712 are the same as step S612 of FIG. 7.

The analog gains of the HIGH image and the LOW image are respectively set to “A setting” and “B setting”, and the digital gains are respectively set to “C setting” and “D setting” in step S713 and step S714. At this time, the image correction parameter that changes according to the gain settings, as with linearity correction of luminance output such as aforementioned, is given as “X”. “X” as referred to here is a parameter that corresponds to the analog gain “A setting” that is applied in acquiring the HIGH image and the analog gain “B setting” that is applied in acquiring the LOW image.

Next, the processing of step S721 that is executed when the set shooting sensitivity is the second sensitivity and it is determined in step S712 to set a different gain ratio from the analog gain ratio of the HIGH image and LOW image of the first sensitivity will be described.

In steps S715 and S716, the analog gains that are applied in acquiring the HIGH image and the LOW image are respectively set to “E setting” and “F setting”, and the digital gains are respectively set to “G setting” and “H setting”. At this time, the image correction parameter changes according to the gain settings, as with linearity correction of the luminance output such as aforementioned, is given as “Y”.

“Y” as referred to here is a parameter that corresponds to the analog gain “E setting” that is applied in acquiring the HIGH image and the analog gain “F setting” that is applied in acquiring the LOW image. Also, in the present embodiment, “X” and “Y” are illustrated as correction parameters arising from the analog gain, but may be correction parameters arising from “C setting”, “D setting”, “G setting”, and “H setting” of the digital gain.

As described above, in the present embodiment, the image correction parameters “X” and “Y” that respectively correspond to “A setting” to “D setting” set in steps S713 and S714 and to “E setting” to “H setting” set in step S715 and step S716 are prepared, and switched according to the shooting mode, shooting conditions, and the like.

According to the third embodiment, in the case where the second sensitivity is set at the time of HDR shooting, it becomes possible to switch the correction parameters according to whether or not the analog gain ratio of the HIGH image and LOW image of the first sensitivity is to be maintained. Thus, it becomes possible to acquire a high-quality image having an expanded dynamic range.

According to the present invention, it becomes possible to acquire a dynamic range expanded image having little variation in noise effect, irrespective of the set shooting sensitivity.

Other Embodiments

Embodiment(s) of the present invention can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:

an analog amplification circuit configured to amplify one pixel signal by a plurality of types of analog gain;

a digital amplification circuit configured to amplify the one pixel signal by a plurality of types of digital gain; and at least one processor or circuit configured to function as:

a control unit configured to perform control so as to, in a case where a target gain is obtainable with only analog gain, perform first control for amplifying the pixel signal by a first gain and a second gain with the analog amplification circuit, and, in a case where the target gain is not obtainable with only analog gain, perform second control for amplifying the pixel signal by the first gain and the second gain, using the analog amplification circuit and the digital amplification circuit, wherein the control unit, in the second control, uses a different analog gain ratio from an analog gain ratio of the analog amplification circuit in the first control.

2. An image capturing apparatus comprising:

an analog amplification circuit configured to amplify one pixel signal by a plurality of types of analog gain;

a digital amplification circuit configured to amplify the one pixel signal by a plurality of types of digital gain; and at least one processor or circuit configured to function as:

a control unit configured to perform control so as to, in a case where a target gain is obtainable with only analog gain, perform first control for amplifying the pixel signal by a first gain and a second gain with the analog amplification circuit, and, in a case where the target gain is not obtainable with only analog gain, perform second control for amplifying the pixel signal by the first gain and the second gain, using the analog amplification circuit and the digital amplification circuit, wherein the control unit, in the second control, switches between maintaining an analog gain ratio of the analog amplification circuit in the first control and using a different analog gain ratio from the analog gain ratio of the analog amplification circuit in the first control, according to a condition of shooting.

3. The image capturing apparatus according to claim 1, wherein the control unit supplements a deficiency in the first gain and the second gain of analog gain of the analog amplification circuit with digital gain of the digital amplification circuit.

4. The image capturing apparatus according to claim 1, wherein the at least one processor or circuit is configured to further function as:

a setting unit configured to set a difference in stages between the first gain and the second gain.

5. The image capturing apparatus according to claim 1, wherein the at least one processor or circuit is configured to further function as a compositing unit configured to composite a first image constituted by a pixel signal amplified by the first gain and a second image constituted by a pixel signal amplified by the second gain.

6. The image capturing apparatus according to claim 5, wherein the compositing unit composites the first image and the second image to generate an HDR image.

7. The image capturing apparatus according to claim 2, wherein the control unit, in the second control, further switches a parameter for image correction, according to whether the analog gain ratio is to be maintained.

8. A control method for controlling an image capturing apparatus including an analog amplification circuit configured to amplify one pixel signal by a plurality of types of analog gain and a digital amplification circuit configured to amplify the one pixel signal by a plurality of types of digital gain, the method comprising:

performing control so as to, in a case where a target gain is obtainable with only analog gain, perform first control for amplifying the pixel signal by a first gain and a second gain with the analog amplification circuit, and, in a case where the target gain is not obtainable with only analog gain, perform second control for amplifying the pixel signal by the first gain and the second gain, using the analog amplification circuit and the digital amplification circuit, wherein in the second control, a different analog gain ratio from an analog gain ratio of the analog amplification circuit in the first control is used.

9. A non-transitory computer readable storage medium storing a program for causing a computer to execute the control method for controlling an image capturing apparatus including an analog amplification circuit configured to amplify one pixel signal by a plurality of types of analog gain and a digital amplification circuit configured to amplify the one pixel signal by a plurality of types of digital gain, the method comprising:

performing control so as to, in a case where a target gain is obtainable with only analog gain, perform first control for amplifying the pixel signal by a first gain and a second gain with the analog amplification circuit, and, in a case where the target gain is not obtainable with only analog gain, perform second control for amplifying the pixel signal by the first gain and the second gain, using the analog amplification circuit and the digital amplification circuit, wherein in the second control, a different analog gain ratio from an analog gain ratio of the analog amplification circuit in the first control is used.

10. A control method for controlling an image capturing apparatus including an analog amplification circuit configured to amplify one pixel signal by a plurality of types of analog gain and a digital amplification circuit configured to amplify the one pixel signal by a plurality of types of digital gain, the method comprising:

performing control so as to, in a case where a target gain is obtainable with only analog gain, perform first control for amplifying the pixel signal by a first gain and a second gain with the analog amplification circuit, and, in a case where the target gain is not obtainable with only analog gain, perform second control for amplifying the pixel signal by the first gain and the second gain, using the analog amplification circuit and the digital amplification circuit, wherein in the second control, switching is performed between maintaining an analog gain ratio of the analog amplification circuit in the first control and using a different analog gain ratio from the analog gain ratio of the analog amplification circuit in the first control, according to a condition of shooting.

11. A non-transitory computer readable storage medium storing a program for causing a computer to execute the control method for controlling an image capturing apparatus including an analog amplification circuit configured to amplify one pixel signal by a plurality of types of analog gain and a digital amplification circuit configured to amplify the one pixel signal by a plurality of types of digital gain, the method comprising:

performing control so as to, in a case where a target gain is obtainable with only analog gain, perform first control for amplifying the pixel signal by a first gain and a second gain with the analog amplification circuit, and, in a case where the target gain is not obtainable with only analog gain, perform second control for amplifying the pixel signal by the first gain and the second gain, using the analog amplification circuit and the digital amplification circuit, wherein in the second control, switching is performed between maintaining an analog gain ratio of the analog amplification circuit in the first control and using a different analog gain ratio from the analog gain ratio of the analog amplification circuit in the first control, according to a condition of shooting.

* * * * *